US010128724B2

(12) United States Patent
Perriere (10) Patent No.: US 10,128,724 B2
(45) Date of Patent: Nov. 13, 2018

(54) ELECTROMAGNETIC MACHINE WITH OPTIMIZED ELECTROMAGNETIC CIRCUIT ELEMENTS INTEGRATED IN TRACKS FORMED AS CRENELLATED ANNULAR LINES

(71) Applicant: SAVE INNOVATIONS, Grenoble (FR)

(72) Inventor: Bernard Perriere, Seyssins (FR)

(73) Assignee: SAVE INNOVATIONS, Grenoble (FR)

( * ) Notice: Subject to any disclaimer, the term of this patent is extended or adjusted under 35 U.S.C. 154(b) by 197 days.

(21) Appl. No.: 15/105,432

(22) PCT Filed: Dec. 19, 2014

(86) PCT No.: PCT/EP2014/078698
§ 371 (c)(1),
(2) Date: Jun. 16, 2016

(87) PCT Pub. No.: WO2015/091930
PCT Pub. Date: Jun. 25, 2015

(65) Prior Publication Data
US 2016/0322884 A1 Nov. 3, 2016

(30) Foreign Application Priority Data
Dec. 20, 2013 (FR) .................................. 13 63313

(51) Int. Cl.
*H02K 1/27* (2006.01)
*H02K 3/04* (2006.01)
(Continued)

(52) U.S. Cl.
CPC ........... *H02K 7/183* (2013.01); *H02K 1/2793* (2013.01); *H02K 3/04* (2013.01); *H02K 3/26* (2013.01);
(Continued)

(58) Field of Classification Search
CPC ........ H02K 1/2793; H02K 3/04; H02K 7/183; H02K 16/04; H02K 21/24
(Continued)

(56) References Cited

U.S. PATENT DOCUMENTS 3,097,319 A * 7/1963 Henry-Baudot ......... H02K 3/26
310/179
3,796,039 A * 3/1974 Lucien ................... G04C 13/11
310/207
(Continued)

FOREIGN PATENT DOCUMENTS

GB 2 164 500 A 3/1986
JP S62-189932 A 8/1987

OTHER PUBLICATIONS

International Search Report and Written Opinion dated Oct. 14, 2015 issued in corresponding application No. PCT/EP2014/078698; w/ English partial translation and partial machine translation (19 pages).
(Continued)

*Primary Examiner* — John K Kim
(74) *Attorney, Agent, or Firm* — Westerman, Hattori, Daniels & Adrian, LLP (57) ABSTRACT

An electromagnetic machine (100) has two first elements, each one having: at least one first electrically conductive track (101) in the form of a crenellated annular line able to form a first plurality of electromagnetic circuits (102) able to interact with at least one magnetic element of the electromagnetic machine; at least one second electrically conductive track (103) arranged in the form of a crenellated annular line able to form a second plurality of electromagnetic circuits (104) able to interact with at least one magnetic element of the electromagnetic machine, said second track (103) being formed along said corresponding first track (101) and such that the circuits (104) of the second plurality
(Continued)

of electromagnetic circuits are each disposed between two successive circuits (102) of the first plurality of electromagnetic circuits. A second element provided with at least one magnetic element is disposed between the two first elements.

21 Claims, 5 Drawing Sheets

(51) Int. Cl.
*H02K 7/18* (2006.01)
*H02K 16/04* (2006.01)
*H02K 21/24* (2006.01)
*H02K 3/26* (2006.01)
*H02K 16/02* (2006.01)

(52) U.S. Cl.
CPC ............ *H02K 16/04* (2013.01); *H02K 21/24* (2013.01); *H02K 16/02* (2013.01); *Y02E 10/725* (2013.01)

(58) Field of Classification Search
USPC ........................................ 310/179, 207, 268
IPC .................. H02K 1/27,3/04, 7/18, 16/04, 21/24
See application file for complete search history.

(56) References Cited

U.S. PATENT DOCUMENTS

| | | | | |
|---|---|---|---|---|
| 4,398,112 A | * | 8/1983 | van Gils | H01F 27/24 310/201 |
| 4,763,053 A | | 8/1988 | Rabe | |
| 4,883,981 A | * | 11/1989 | Gerfast | H02K 3/04 310/179 |
| 5,616,977 A | * | 4/1997 | Hill | H02K 3/12 29/596 |
| 7,582,999 B2 | * | 9/2009 | Atkinson | H02K 3/50 310/179 |
| 9,748,804 B2 | * | 8/2017 | Klassen | H02K 1/20 |
| 9,755,463 B2 | * | 9/2017 | Klassen | H02K 1/20 |
| 2003/0030348 A1 | | 2/2003 | Lopatinsky et al. | |
| 2006/0197397 A1 | | 9/2006 | Takahashi et al. | |
| 2007/0024144 A1 | * | 2/2007 | Obidniak | H02K 21/24 310/156.36 |
| 2010/0072850 A1 | | 3/2010 | Miyata et al. | |
| 2011/0037337 A1 | | 2/2011 | Denne | |
| 2012/0139379 A1 | | 6/2012 | Ge et al. | |
| 2016/0322884 A1 | * | 11/2016 | Perriere | H02K 3/04 |

OTHER PUBLICATIONS

French Search Report and Written Opinion dated Sep. 1, 2014 issued in counterpart application No. FR1363313; w/ English partial translation and partial machine translation (18 pages).
European Office Action dated Jun. 26, 2017 in corresponding European application No. 14828030.8; with English machine translation (9 pages).
European Office Action dated Apr. 18, 2018 in corresponding European application No. EP14828030.8; with English machine translation (15 pages).

* cited by examiner

ELECTROMAGNETIC MACHINE WITH OPTIMIZED ELECTROMAGNETIC CIRCUIT ELEMENTS INTEGRATED IN TRACKS FORMED AS CRENELLATED ANNULAR LINES

TECHNICAL FIELD OF THE INVENTION

The invention concerns the field of so-called "rotary" electromagnetic machines, that is, those outfitted with a rotor and a stator.

More particularly, the purpose of the invention is an electromagnetic machine of a new design.

PRIOR ART

In the field of electromagnetism, and especially rotary machines, it is customary to use a stator having a plurality of coils each one formed by a winding of turns in which a current is induced when the rotor associated with the stator and outfitted with magnets is placed in rotation. The current generated is then a function of the coils used and the magnets used. The winding of the coils is done along an axis essentially perpendicular to one polar face of a magnet of the rotor.

The coils do not allow one to maximize the interaction between a magnet and an associated coil. What is more, the winding of a coil takes a long time to accomplish.

Interconnecting coils in the context of a miniaturized stator is a tedious step in the context of the production of the stator.

PURPOSE OF THE INVENTION

The goal of the present invention is to propose a solution which remedies some or all of the drawbacks mentioned above.

One approaches this goal in particular by the enclosed claims and more particularly thanks to an electromagnetic machine comprising two first elements, preferably identical, each one having:

- at least one first electrically conductive track in the form of a crenellated annular line able to form a first plurality of electromagnetic circuits able to interact with at least one magnetic element of the electromagnetic machine,
- at least one second electrically conductive track arranged in the form of a crenellated annular line able to form a second plurality of electromagnetic circuits able to interact with at least one magnetic element of the electromagnetic machine, said second track being formed along said corresponding first track and such that the circuits of the second plurality of electromagnetic circuits are each disposed between two successive circuits of the first plurality of electromagnetic circuits, and in that the two first elements are disposed on either side of a second element along an axis of rotation associated with a relative movement of rotation, said second element being provided with at least one magnetic element adapted so as to interact with the circuits of at least one of the two first elements during the relative movement of rotation between said at least one of the two first elements and the second element.

According to one embodiment, for each first element, said at least one first track has a plurality of electrically conductive transverse flanks, each one extending between a first discontinuous lateral edge of the first track and a second discontinuous lateral edge of the first track, each circuit of the first plurality of electromagnetic circuits having a pair of adjacent transverse flanks of the first track, and for each first element said at least one second track has a plurality of electrically conductive transverse flanks, each one extending between a third discontinuous lateral edge of the second track and a fourth discontinuous lateral edge of the second track, each circuit of the second plurality of electromagnetic circuits having a pair of adjacent transverse flanks of the second track, in particular the third discontinuous lateral edge is situated between the first and second discontinuous lateral edges and the second discontinuous lateral edge is situated between the third and fourth discontinuous edges.

In particular, for each first element:

- the first discontinuous lateral edge is formed by a plurality of first electrically conductive segments each one connecting two transverse flanks of the first track,
- the second discontinuous lateral edge is formed by a plurality of second electrically conductive segments each one connecting two transverse flanks of the first track,
- the third discontinuous lateral edge is formed by a plurality of third electrically conductive segments each one connecting two transverse flanks of the second track,
- the fourth discontinuous lateral edge is formed by a plurality of fourth electrically conductive segments each one connecting two transverse flanks of the second track, and, for each first element, the first and fourth segments each have a length greater than that of each of the second and third segments.

For example, each first element comprises a stack of first tracks and a stack of second tracks, especially extending in parallel directions.

According to one embodiment, each magnetic element of the second element is situated so as to interact, during one complete revolution of one of the first or second elements about an associated axis of rotation, with each circuit of said at least one first track and/or with each circuit of said at least one second track.

In particular, each magnetic element has, especially in parallel with the conductive tracks, a section such that at every instant of the relative movement of rotation, said magnetic element does not arrive opposite more than two transverse flanks of a pair of first and second tracks.

Furthermore, the machine can have an overlapping configuration in which each circuit of the first plurality of electromagnetic circuits and of the second plurality of electromagnetic circuits is opposite a corresponding magnetic element.

According to one particular embodiment, the machine can have two additional elements, each one comprising:

- at least one first electrically conductive track having the form of an annular crenellated line so as to form a first plurality of electromagnetic circuits able to interact with at least one magnetic element of the electromagnetic machine,
- at least one second electrically conductive track arranged in the form of an annular crenellated line so as to form a second plurality of electromagnetic circuits able to interact with at least one magnetic element of the electromagnetic machine, said second track being formed along said corresponding first track and such that the circuits of the second plurality of electromagnetic circuits are each disposed between two successive circuits of the first plurality of electromagnetic circuits, and in that said two additional elements radially surround the second element.

Furthermore, the machine can have an operating configuration in which the interaction of each magnetic element with at least one corresponding circuit of the first element enables a generating of an electric current within said corresponding circuit.

In particular, the machine can have an operating configuration in which the circuits interact with at least one magnetic element (201) in order to generate the relative movement of rotation.

According to one embodiment, the second element comprises a plurality of magnetic elements designed so as to present, opposite the first element, alternately a positive pole and a negative pole, so that in the course of the relative movement of rotation, when all the circuits of the first plurality of electromagnetic circuits are each in interaction with positive poles, all the circuits of the second plurality of electromagnetic circuits are each in interaction with negative poles.

Preferably, in the course of the relative movement of rotation, said at least one magnetic element, or each of the magnetic elements, never arrives opposite the first, second, third and fourth discontinuous edges.

The invention also pertains to a turbine comprising an electromagnetic machine as described and in which the second element forms a rotor able to be placed in rotation by a fluid.

BRIEF DESCRIPTION OF THE DRAWINGS

Other advantages and characteristics will emerge more clearly from the following description of particular embodiments of the invention, given as nonlimiting examples and represented in the enclosed drawings, where.

DESCRIPTION OF PREFERRED
EMBODIMENTS OF THE INVENTION

The element forming a rotor or stator as described below differs from the prior art in that the coils are replaced by crenellated tracks, preferably largely flat ones.

Figures 1, 2:
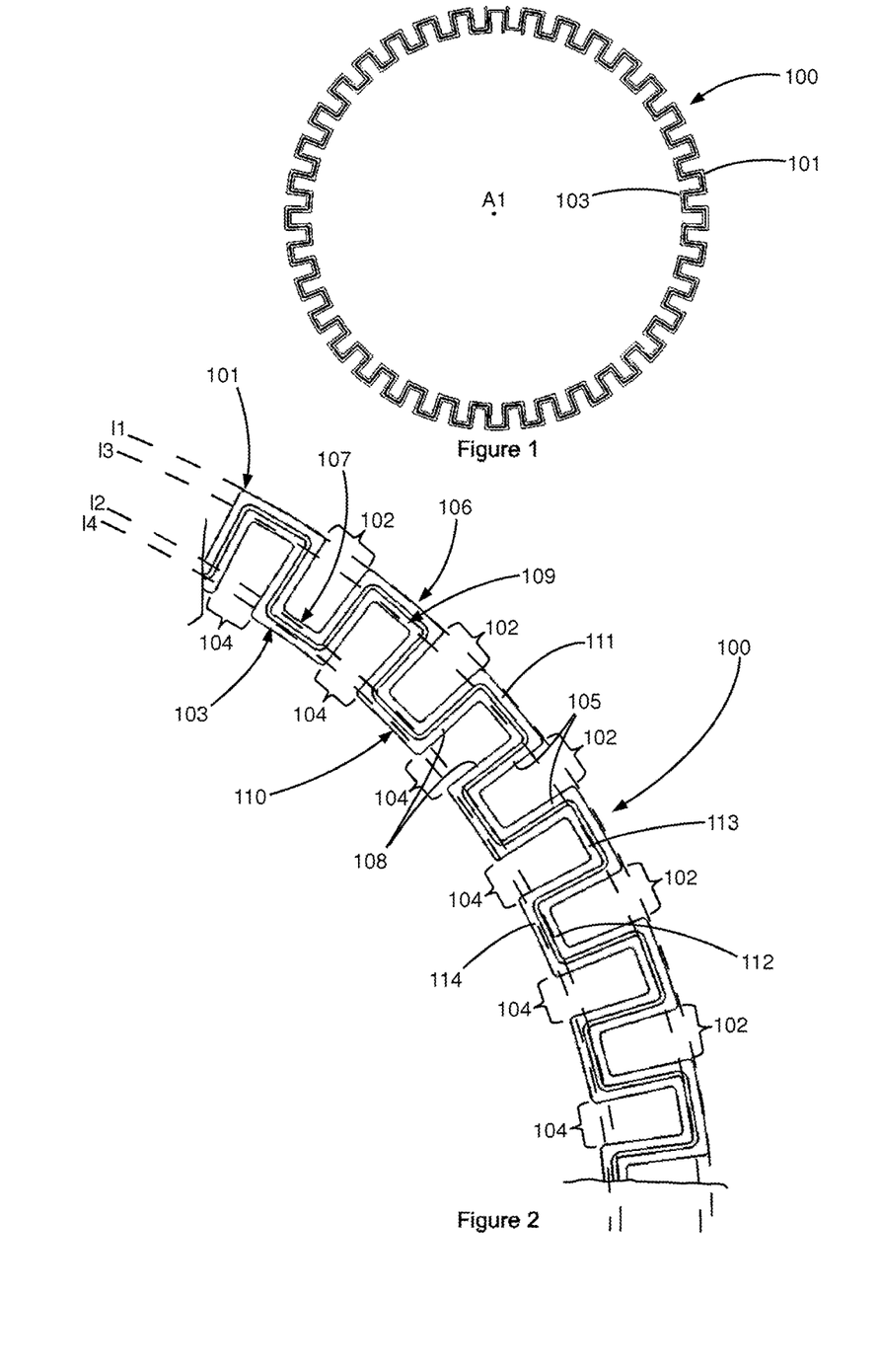
FIG. 1 is a front view of an element of the electromagnetic machine according to one embodiment of the invention intended in particular to be used to recuperate an axial magnetic flux.
FIG. 2 is a partial view of FIG. 1 showing a local enlargement of the element of the electromagnetic machine.

As illustrated in FIGS. 1 and 2, the element 100 of the electromagnetic machine, forming in particular a stator or rotor, contains at least a first electrically conductive track 101 having the form of an annular crenellated line so as to form a first plurality of electromagnetic circuits 102 able to interact with at least one magnetic element (not shown in FIGS. 1 and 2) of the electromagnetic machine. The element 100 further contains at least one second electrically conductive track 103 designed to form an annular crenellated line so as to form a second plurality of electromagnetic circuits 104 able to interact with at least one magnetic element of the electromagnetic machine. Said second track 103 is formed along said corresponding first track 101 and such that the circuits 104 of the second plurality of electromagnetic circuits are each disposed between two successive circuits 102 of the first plurality of electromagnetic circuits.

One will therefore understand that the electromagnetic machine may contain a plurality of magnetic elements. Each magnetic element is advantageously a dipole magnet. That is, a magnet comprising one north face and one south face, the field lines issuing from the magnetic field of the magnet extending between the north and south poles of said magnet.

By "electromagnetic circuit" is meant here a circuit behaving similar to a turn of a coil in the context of its interaction with a magnetic element such as a dipole magnet. In fact, the circuit can be an induced circuit in which is generated electric current during the interaction with the magnetic element in the context of an electromagnetic machine operating as a generator of electric current. Alternatively, the circuit can generate a magnetic field by deliberate application of an electric current traversing said circuit, during the interaction with the magnetic element(s), the electromagnetic machine then functioning as a motor.

The electromagnetic machine is typically a rotary machine comprising a stator and a rotor. The electromagnetic machine could be of the axial magnetic flux type (preferably at least a portion of the dipole magnetic elements being then designed such that the axis passing through the two magnetic poles of each of the magnetic elements of said at least one portion of the magnetic elements is parallel to an axis of rotation A1 of the rotor of the electromagnetic machine and the tracks are designed to be facing a pole of each magnetic element) and/or of the radial magnetic flux type (preferably at least a portion of the dipole magnetic elements being then designed such that the axis passing through the two magnetic poles of each of the magnetic elements of said at least one portion of the magnetic elements is perpendicular to an axis of rotation A1 of the rotor of the electromagnetic machine and the tracks are designed to be facing a pole of each magnetic element, alternatively the axes of the magnetic elements are similar to those of the axial magnetic flux type but the tracks will be designed so as to interact with the field lines between the two magnetic poles of each magnetic element).

Advantageously, a pair of tracks comprising a first track and a second track is such that the first and second tracks are advantageously included in the same surface, preferably being planar (for example, in the plane of FIGS. 1 and 2) so as to exploit an axial magnetic flux, or a cylindrical surface of circular section (FIG. 3) in order to exploit a radial magnetic flux.

In particular, the first element(s) are such that the first plurality of circuits and the second plurality of circuits do not overlap/become superimposed in a direction normal to the plane including a pair of first and second tracks.

Preferably, the first and second tracks are configured (all or some of them) in the form of a band having a square or rectangular section, in a plane perpendicular to the at least local elongation of the band. The band then has a principal face, designed to be facing one or more magnetic elements, which is perpendicular to the direction orienting the thickness of the band. The transverse dimensions of the principal face of the band along its at least local elongation, preferably at every point of the track in question, are greater than the dimension defining the thickness of the band.

According to a particular embodiment, said at least one first track 101 has a plurality of electrically conductive transverse flanks 105 each extending between a first discontinuous lateral edge 106 (configured along the dotted line $l_1$ in FIG. 2) of the first track 101 and a second discontinuous lateral edge 107 (configured along the dotted line $l_2$ in FIG. 2) of the first track 101. Each circuit 102 of the first plurality of electromagnetic circuits comprises a pair of adjacent transverse flanks 105 of the first track 101. Moreover, said at least one second track 103 comprises a plurality of electrically conductive transverse flanks 108 each extending between a third discontinuous lateral edge 109 (configured along the dotted line $l_3$ in FIG. 2) of the second track 103 and a fourth discontinuous lateral edge 110 (configured along the dotted line $l_4$ in FIG. 2) of the second track 103. Each circuit 104 of the second plurality of electromagnetic circuits comprises a pair of adjacent transverse flanks 108 of the second track 103. The discontinuous lateral edges are, of course, electrically conductive.

It will be understood that, for each track, the above-described band can have an at least local elongation for each discontinuous edge and each transverse flank.

Preferably, at least the transverse flanks of the first and second tracks 101, 103 have a square or rectangular section in the form of a bar. This form of section enables a maximizing of the result of the interaction between a circuit and a magnetic element during its passage opposite the circuit. The discontinuous lateral edges serving as a plain electrical conductor, their sections can be circular or square or rectangular.

The first and second tracks 101, 103 are advantageously dimensioned such that each transverse flank is only part of a single circuit. In other words, each circuit is separated from an adjacent circuit of the same track by a distance such that the magnetic element(s) cannot arrive opposite two adjacent transverse flanks of two different circuits of the same track. Otherwise, parasitic effects might diminish or cancel out the efficiency of the electromagnetic machine.

Figure 3:
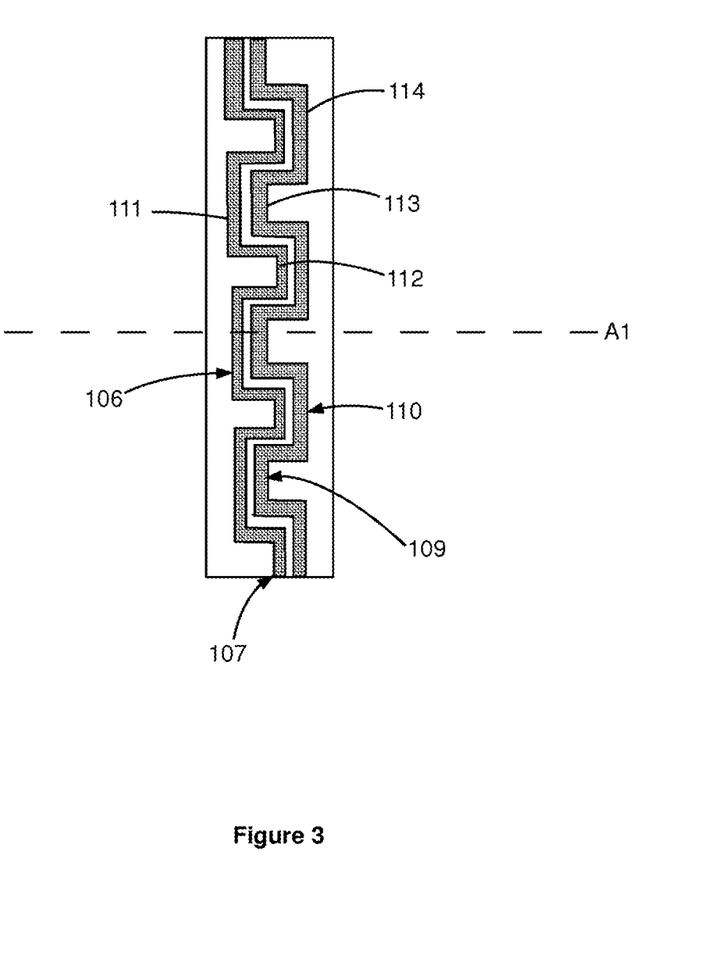
FIG. 3 is a side view of an element of the electromagnetic machine according to another embodiment of the invention designed in particular to be used to recuperate an axial magnetic flux.

In the sample embodiment of FIGS. 1 to 3, the third discontinuous lateral edge 109 is situated between the first and second discontinuous lateral edges 106 and 107, and the second discontinuous lateral edge 107 is situated between the third and fourth discontinuous edges 109 and 110.

According to a more detailed description, the first discontinuous lateral edge 106 is formed by a plurality of first electrically conductive segments 111, each one joining two transverse flanks 105 of the first track 101. The second discontinuous lateral edge 107 is formed by a plurality of second electrically conductive segments 112, each one joining two transverse flanks 105 of the first track 101. The third discontinuous lateral edge 109 is formed by a plurality of third electrically conductive segments 113, each one joining two transverse flanks 108 of the second track 103. The fourth discontinuous lateral edge 110 is formed by a plurality of fourth electrically conductive segments 114, each one joining two transverse flanks 108 of the second track 103. The first and fourth segments (111, 114) each have a length greater than that of each of the second and third segments (112, 113). More generally, this condition on the lengths of the segments allows the adjacent transverse flanks of two adjacent circuits (that is, directly joined by a first segment in the framework of the first track or by a fourth segment in the framework of the third track) to not form an electromagnetic circuit in the sense as defined above. In other words, the magnetic element could not interact with the transverse flanks of two adjacent circuits of the same track. Such an interaction would induce parasitic effects, reducing or cancelling out the efficiency of the electromagnetic machine.

It will then be understood that the form of an annular crenellated line of the first track is produced by the fact that for each transverse flank of the first track, outside of the transverse flanks of the ends of the first track, said transverse flank is joined on the one hand to a previous transverse flank by a first segment and on the other hand to a following transverse flank by a second segment. In this paragraph, the terms first track, first segment and second segment can be replaced respectively by second track, third segment and fourth segment.

According to an embodiment allowing for better utilization of the interaction between a rotor and a stator of the electromagnetic machine, the element comprises a stack of first tracks and a stack of second tracks. In particular, the stacks extend in parallel directions. Of course, to prevent any electrical short circuit, two tracks of the same stack are separated by an electrical insulator.

In the context of an electromagnetic machine of axial magnetic flux, the above-mentioned stacks are along an axis of rotation of the rotor of the electromagnetic machine. In the context of an electromagnetic machine of radial magnetic flux, the above-mentioned stacks are along a direction perpendicular to an axis of rotation of the rotor of the electromagnetic machine.

According to a first example, in the context of an electromagnetic machine of radial magnetic flux, the first, second, third and fourth discontinuous lateral edges of a first track and a second associated track are each included respectively along a first circle, a second circle, a third circle and a fourth circle. Said first, second, third and fourth circles are staggered along the same axis (in particular, forming the axis of rotation of the rotor of the electromagnetic machine) and each of them has a radius of the same length.

According to a second example, in the context of an electromagnetic machine of axial magnetic flux, the first, second, third and fourth discontinuous lateral edges of a first track and a second associated track are each included respectively along a first circle, a second circle, a third circle and a fourth circle. Said first, second, third and fourth circles are included in the same plane and have the same centre (in particular, through which the axis of rotation of the rotor of the electromagnetic machine can pass). In this example, the radius of the first circle is greater than the radius of the third circle, which is in turn greater than the radius of the second circle, which is in turn greater than the radius of the fourth circle.

Preferably, the aforementioned element having the first and second tracks is a stator of the electromagnetic machine.

Figure 4:
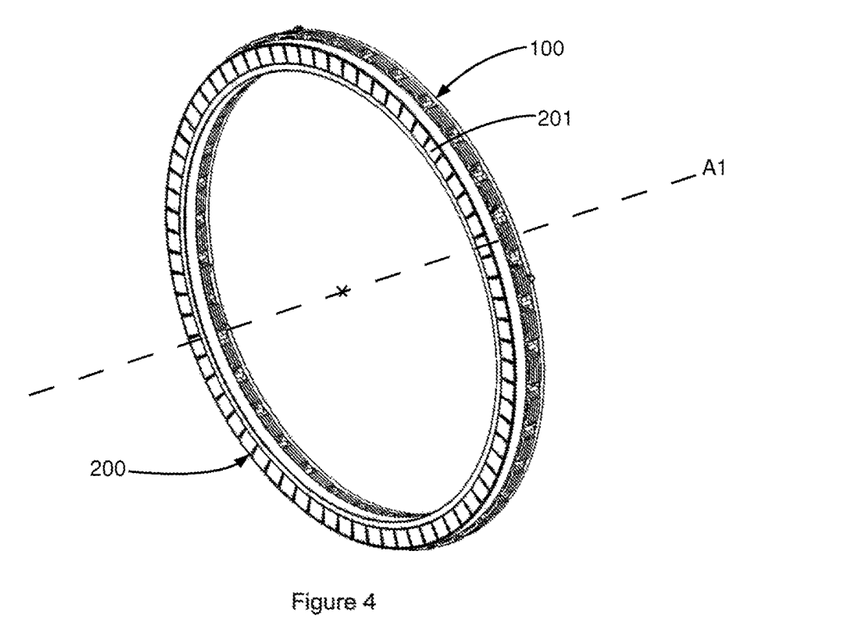
FIG. 4 is a perspective view of an electromagnetic machine according to one embodiment of the invention.
Figure 5:
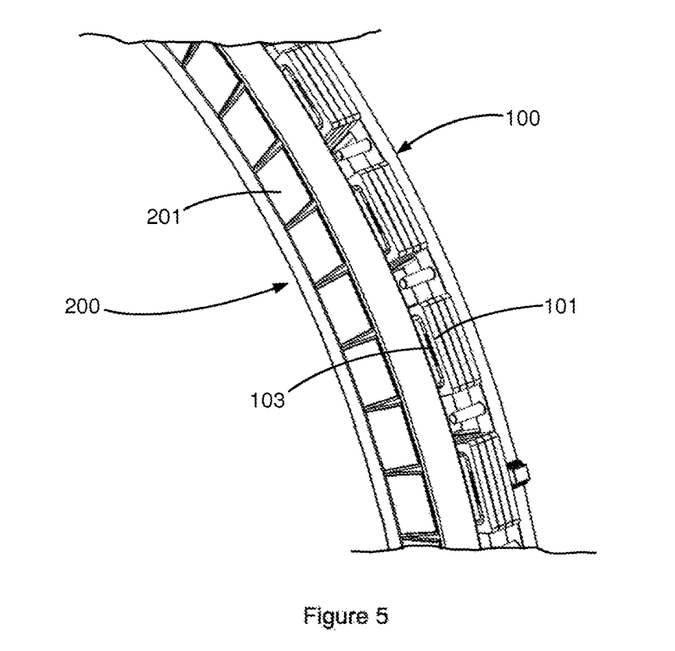
FIG. 5 illustrates an enlarged view of a portion of FIG. 4.

It will then be understood that the invention also pertains to an electromagnetic machine, such as is illustrated in FIGS. 4 and 5, comprising at least a first element 100, especially one forming a stator, as described above, and a second element 200, especially one forming a rotor, provided with at least one magnetic element 201 designed to interact with the circuits (the circuits of the first plurality of circuits and of the second plurality of electromagnetic circuits) of the first element 100 during a relative movement of rotation between the first 100 and second 200 elements.

By relative movement of rotation between the first and second elements 100, 200 it is meant that there is an axis of rotation A1 (visible in FIGS. 1, 3, 4 and 6) about which one of said first and second elements rotates, while the other said first and second elements remain fixed in place.

In FIG. 5, the first element 100 comprises a stack of first tracks 101 and second tracks 103. Of course, this is only a particular example, and in fact a single first track 101 and a single second track 103 could have also been used.

Figure 6:
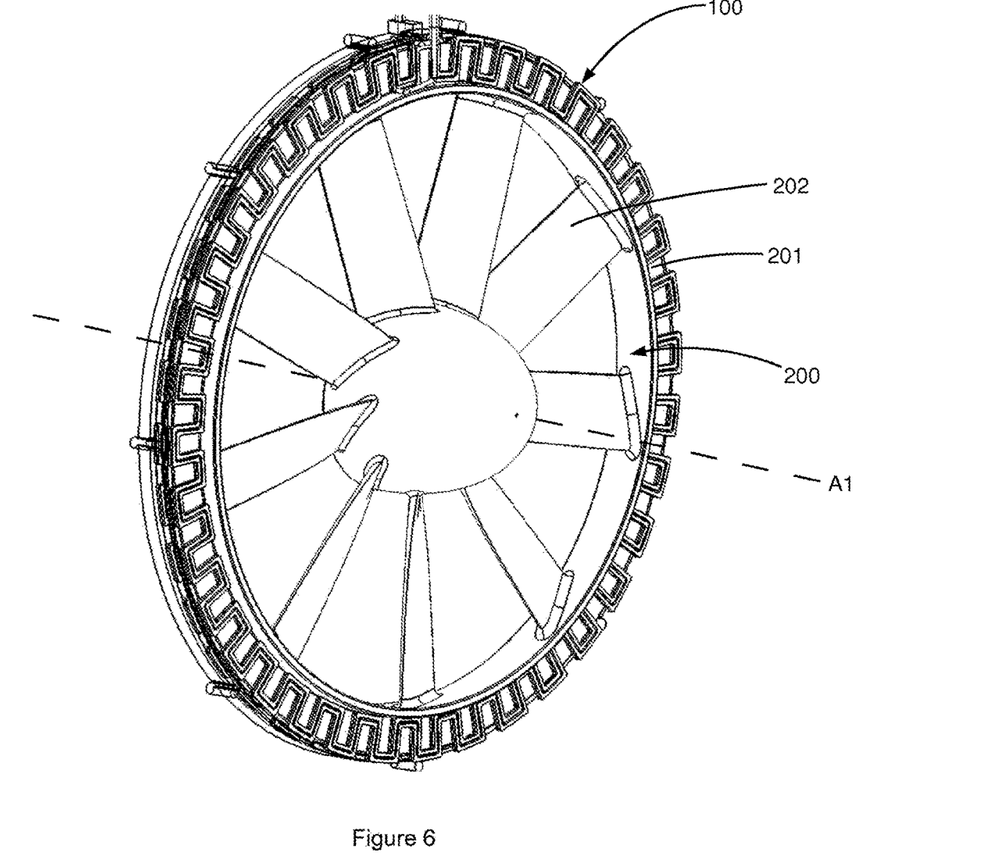
FIG. 6 illustrates an electromagnetic machine forming a turbine.

In particular, the second element 200 can comprise at least one vane 202 as illustrated in FIG. 6. Then, the second element 200 forms a rotor of the electromagnetic machine and the first element 100 forms the stator of the electromagnetic machine. In the example of FIG. 6, a plurality of vanes 202 forms a helix of the rotor. The helices then extend between the axis of rotation A1 of the rotor and an external ring of the rotor carrying (or formed by) magnetic elements designed to interact with the circuits of the first element 100.

It will then be understood that in general a turbine can comprise an electromagnetic machine such as has been described and in which the second element 200 forms a rotor able to be placed in rotation by a fluid. The first element 100 then forms the stator of the electromagnetic machine. The turbine can then be a wind turbine (the fluid being air) or a hydraulic turbine (the fluid being a liquid).

In particular, the second element 200 comprises a plurality of magnetic elements 201 advantageously as described above. Each magnetic element 201 is then disposed such that, during the movement of rotation, it cooperates with the different circuits of the first element 100.

In other words, according to one embodiment, each magnetic element 201 of the second element 200 is situated so as to interact, during the course of one complete revolution of one of the first or second element 100, 200 about an associated axis of rotation (preferably a complete revolution of the second element 200 forming the rotor about its axis of rotation A1), with each circuit 102 of said at least one first track 101 and/or with each circuit 104 of said at least one second track 103. This makes it possible to ensure an improved efficiency both in motor mode and in generator mode of the electromagnetic machine.

Preferably, the electromagnetic machine is such that each magnetic element 201 has, especially in parallel with the conductive tracks, a section such that at every instant of the relative movement of rotation, said magnetic element 201 does not arrive opposite more than two transverse flanks of a pair of first and second tracks. In other words, in the course of the relative movement of rotation, one face of the magnetic element 201 defining a magnetic pole (north or south) of said magnetic element 201 passes opposite each circuit of the first element (this being particularly true of each magnetic element), and this face is dimensioned such that it never overlaps more than two transverse flanks 105, 108 of a pair of first and second tracks of the first element 100.

When a magnetic element 201, or a face of the latter, arrives opposite two lateral flanks in the course of its rotation, one understands that there then exists a gap along the axis of rotation (along the axis of rotation means parallel in the case of axial magnetic flux and perpendicular in the case of radial magnetic flux) between said magnetic element and the two lateral flanks involved.

Thus, at every instant of the rotation of one of the magnetic elements, the two transverse flanks straddled by said magnetic element belong either to the first track, or to the second track, or to the first and second tracks.

Preferably, and still with the expectation of improving and/or maximizing the efficiency of the electromagnetic machine, during the course of the relative movement of rotation said at least one magnetic element or each of the magnetic elements 201 never arrives opposite the first, second, third and fourth discontinuous edges 106, 107, 109, 110. In other words, during the course of the rotation of the rotor, the face of the magnetic element defining a magnetic pole (north or south) of said magnetic element 201 passes opposite each circuit of the first element (this being particularly true of each magnetic element) without ever being opposite the discontinuous edges of the first and second tracks.

In order to optimize the efficiency of the electromagnetic machine, the first and second tracks are adapted to the form of the magnetic element (or magnetic elements), particularly to the dimensions of the face of the magnetic element 201 (forming in particular a magnetic pole) opposite the first element 100 during the movement of rotation. In particular, the faces of all the magnetic elements disposed opposite the first element all have the same dimensions and are such as to obey the conditions of straddling such as have been described. The form of the face can then be square, rectangular, or even trapezoidal.

Thus, in a way generally applicable to all which has been said above, the crenellated line form does not mean the presence of transverse flanks which are parallel to each other. The crenellation of the line can be such that the crenellations have a shape tending toward an omega or a sine wave. In particular, the transverse flanks can each extend along different radii of the same circle.

According to one particular embodiment, the electromagnetic machine has an overlapping configuration in which each circuit 102, 104 of the first plurality of electromagnetic circuits and of the second plurality of electromagnetic circuits is opposite a corresponding magnetic element 201. In other words, there are as many magnetic elements as electromagnetic circuits contained in a pair of first and second tracks. This allows a maximized efficiency of the electromagnetic machine.

Preferably, the magnetic elements 201 are designed as illustrated in FIG. 4, that is, so as to form a closed magnetic ring. In other words, the second element 200 can have a plurality of magnetic elements 201 staggered, in particularly at regular intervals, along an annular line (forming a circle, for example) centred on the axis of rotation A1.

In particular, the second element 200 has a plurality of magnetic elements 201 designed so as to present, opposite the first element 100, alternately a positive pole and a negative pole, so that in the course of the relative movement of rotation, when all the circuits of the first plurality of electromagnetic circuits are each in interaction with positive poles, all the circuits of the second plurality of electromagnetic circuits are each in interaction with negative poles. Moreover, in the course of the relative movement of rotation, when all the circuits of the first plurality of electromagnetic circuits are each in interaction with negative poles, all the circuits of the second plurality of electromagnetic circuits are each in interaction with positive poles. As mentioned above, the electromagnetic machine can function in motor or generator mode. Thus, the electromagnetic machine can have an operating configuration in which the interaction of each magnetic element 201 with at least one corresponding circuit of the first element 100 enables a generation of an electric current within said corresponding circuit. Moreover, the electromagnetic machine can have, alternatively or in combination with the current generating mode, an operating configuration in which the circuits (or at least one circuit) interact with at least one magnetic element 201 in order to generate the relative movement of rotation.

Figure 7:
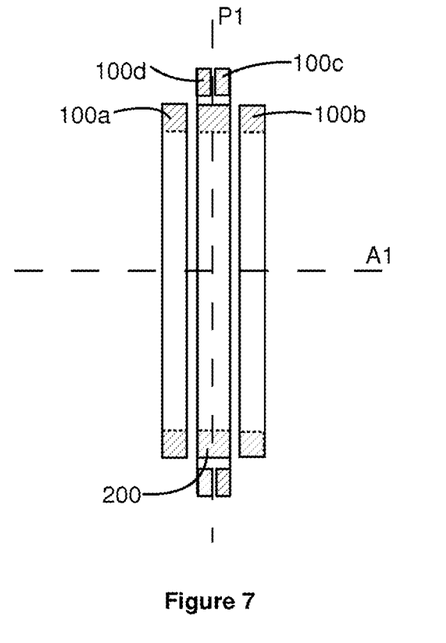
FIGS. 7 and 8 illustrate variant embodiments of the electromagnetic machine.

In order to optimize the efficiency by taking advantage of two faces (in other words, two opposite poles) of the magnetic elements, the electromagnetic machine can contain, as illustrated schematically in FIG. 7, two first elements 100a, 100b, preferably identical, such as have been described and disposed on either side of the second element 200 along an axis of rotation A1 associated with the relative movement of rotation. Preferably, the element 200 here forms the rotor and the elements 100a, 100b form two stators. Here, one of the two first elements is configured so as to face one of the magnetic poles of a magnetic element during the course of the relative movement of rotation while the other of the two first elements is configured so as to face the other of the magnetic poles of said magnetic element.

Thus, one understands from the different figures and from what has been stated above that, when the electromagnetic machine has the two first elements 100a, 100b, said at least one magnetic element 201, and in particular each magnetic element 201 of the second element 200, is adapted so as to interact with the circuits of at least one of the two first elements 100a, 100b and preferably with the circuits of the two first elements 100a, 100b during the relative movement of rotation between the first and second elements 200. In fact, the relative movement of rotation is relative between the two first elements 100a and 100b which form preferably the stator and the second element 200 which forms preferably the rotor. As a result, each of the first elements cooperates with the same second element in similar fashion, despite the fact that the magnetic polarities are reversed for the same magnetic element. In other words, all that has been said in the present description regarding the cooperation between the first element 100 and the second element 200 applies to the two first elements 100a, 100b when they are disposed on either side of the second element 200.

According to one possible improvement, the electromagnetic machine can also have, in particular in addition to the two first elements 100a, 100b, two additional elements 100c 100d (FIG. 7) each one formed by another element of the electromagnetic machine as described (that is, having first and second tracks) and radially surrounding the second element 200. In this case, one of the additional elements 100c is configured so as to interact with a first magnetic pole of a magnetic element while the other of the additional elements is configured so as to interact with a second magnetic pole (opposite the first pole) of said magnetic element. The plane P1 here is perpendicular to the axis of rotation A1 of the rotor formed preferably by the element 200. This allows, in particular, utilizing the field lines between the two opposite magnetic poles of the same magnetic element in order to generate even more electric current.

Figure 8:
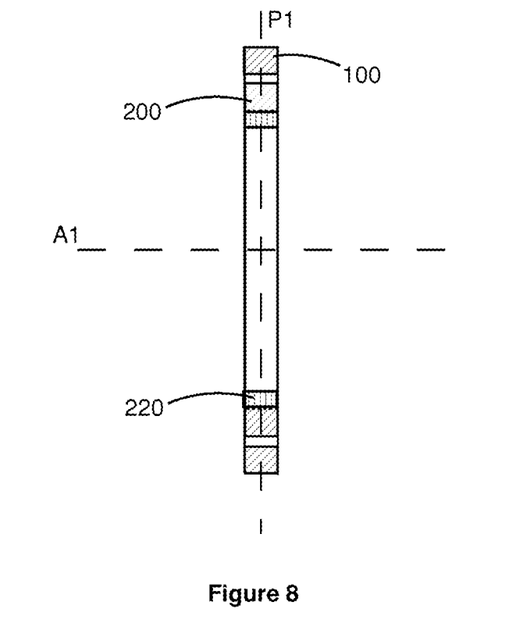

According to one variant illustrated in FIG. 8, the first element 100 is disposed so that it surrounds the second element 200. In other words, the first and second elements 100, 200 are included in the same plane P1 which is also the plane of rotation, particularly of the second element 200, that is, perpendicular to the axis A1 of rotation. In this case, each magnetic element presents one magnetic pole facing said first element 100, and preferably the other magnetic pole is mounted on a steel ring 220.

In a way generally applicable to all which has been said above, the first and second tracks can be formed of copper. Such tracks can easily be made by stamping and cutting. Moreover, the final shape is obtained directly without long and tedious steps of welding as in the context of coils of the prior art.

Preferably, and in a way which is applicable to all that has been said above, each of the transverse flanks of the first and/or second tracks is straight, while the segments joining two adjacent transverse flanks of the same track are curved.

Furthermore, in order to improve the efficiency of the electromagnetic machine, the person skilled in the art could add, to each element comprising the first and second crenellated tracks, masses of magnetic material making it possible to concentrate the fluxes. For example, the element comprising the first and second crenellated tracks could contain one or more magnetic cores designed so that the first and second tracks are disposed between each magnetic element and all or some of the magnetic core(s). In particular, the masses of magnetic material, or a portion of these masses, can be disposed between each transverse flank of an electromagnetic circuit. The masses of magnetic material can be disposed so as to decrease the residual magnetic torque.

The invention claimed is:

1. Electromagnetic machine comprising two first elements, each of the first elements having:
   at least one first electrically conductive track in the form of a crenellated annular line able to form a first plurality of electromagnetic circuits able to interact with at least one magnetic element of the electromagnetic machine,
   at least one second electrically conductive track arranged in the form of a crenellated annular line able to form a second plurality of electromagnetic circuits able to interact with at least one magnetic element of the electromagnetic machine, the second track being formed along the corresponding first track and so that the circuits of the second plurality of electromagnetic circuits are each disposed between two successive circuits of the first plurality of electromagnetic circuits,
   wherein the two first elements are disposed on either side of a second element along an axis of rotation associated with a relative movement of rotation, the second element being provided with at least one magnetic element adapted so as to interact with the circuits of at least one of the two first elements during the relative movement of rotation between the at least one of the two first elements and the second element,
   wherein, for each first element, the at least one first track has a plurality of electrically conductive transverse flanks, each of the flanks extending between a first discontinuous lateral edge of the first track and a second discontinuous lateral edge of the first track, each circuit of the first plurality of electromagnetic circuits having a pair of adjacent transverse flanks of the first track, and wherein, for each first element, the at least one second track has a plurality of electrically conductive transverse flanks, each one extending between a third discontinuous lateral edge of the second track and a fourth discontinuous lateral edge of the second track, each circuit of the second plurality of electromagnetic circuits having a pair of adjacent transverse flanks of the second track.

2. The machine according to claim 1, wherein the third discontinuous lateral edge is situated between the first and second discontinuous lateral edges and the second discontinuous lateral edge is situated between the third and fourth discontinuous edges.

3. The machine according to claim 1, wherein, for each first element:
   the first discontinuous lateral edge is formed by a plurality of first electrically conductive segments, each of the first segments connecting two transverse flanks of the first track,
   the second discontinuous lateral edge is formed by a plurality of second electrically conductive segments, each of the second segments connecting two transverse flanks of the first track, the third discontinuous lateral edge is formed by a plurality of third electrically conductive segments, each of the third segments connecting two transverse flanks of the second track, the fourth discontinuous lateral edge is formed by a plurality of fourth electrically conductive segments, each of the fourth segments connecting two transverse flanks of the second track, and wherein, for each first element, the first and fourth segments each have a length greater than a length of each of the second and third segments.

4. The machine according to claim 1, wherein each first element comprises a stack of first tracks and a stack of second tracks.

5. The machine according to claim 1, wherein each magnetic element of the second element is situated so as to interact, during one complete revolution of one of the first or second elements about an associated axis of rotation, with each circuit of said at least one first track and/or with each circuit of said at least one second track.

6. The machine according to claim 1, wherein each magnetic element has a section so that at every instant of the relative movement of rotation, the magnetic element does not arrive opposite more than two transverse flanks of a pair of first and second tracks.

7. The machine according to claim 1, wherein the machine has an overlapping configuration in which each circuit of the first plurality of electromagnetic circuits and of the second plurality of electromagnetic circuits is opposite a corresponding magnetic element.

8. The machine according to claim 1, comprising two additional elements, each of the additional elements comprising:

at least one first electrically conductive track having the form of an annular crenellated line so as to form a first plurality of electromagnetic circuits able to interact with at least one magnetic element of the electromagnetic machine, at least one second electrically conductive track arranged in the form of an annular crenellated line so as to form a second plurality of electromagnetic circuits able to interact with at least one magnetic element of the electromagnetic machine, the second track being formed along the corresponding first track and so that the circuits of the second plurality of electromagnetic circuits are each disposed between two successive circuits of the first plurality of electromagnetic circuits, wherein the two additional elements radially surround the second element.

9. The machine according to claim 1, wherein the machine has an operating configuration in which the interaction of each magnetic element with at least one corresponding circuit of the first element enables a generating of an electric current within the corresponding circuit.

10. The machine according to claim 1, wherein the machine has an operating configuration in which the circuits interact with at least one magnetic element in order to generate the relative movement of rotation.

11. The machine according to claim 1, wherein the second element comprises a plurality of magnetic elements designed so as to present, opposite the first element, alternately a positive pole and a negative pole, so that in the course of the relative movement of rotation, when all the circuits of the first plurality of electromagnetic circuits are each in interaction with positive poles, all the circuits of the second plurality of electromagnetic circuits are each in interaction with negative poles.

12. The machine according to claim 1, wherein, in the course of the relative movement of rotation, the at least one magnetic element never arrives opposite the first, second, third and fourth discontinuous edges.

13. Turbine comprising the electromagnetic machine according to claim 1, wherein the second element forms a rotor able to be placed in rotation by a fluid.

14. The machine according to claim 4, wherein the stack of first tracks and the stack of second tracks extend in parallel directions.

15. The machine according to claim 6, wherein the section of each magnetic element so that at every instant of the relative movement of rotation, the magnetic element does not arrive opposite more than two transverse flanks of a pair of first and second tracks is in parallel with the conductive track.

16. The machine according to claim 12, wherein, in the course of the relative movement of rotation, each of the magnetic elements never arrives opposite the first, second, third and fourth discontinuous edges.

17. The machine according to claim 1, wherein each first element comprises a stack of first tracks and a stack of second tracks.

18. The machine according to claim 3, wherein each first element comprises a stack of first tracks and a stack of second tracks.

19. The machine according to claim 1, wherein each magnetic element of the second element is situated so as to interact, during one complete revolution of one of the first or second elements about an associated axis of rotation, with each circuit of the at least one first track and/or with each circuit of the at least one second track.

20. The machine according to claim 3, wherein each magnetic element of the second element is situated so as to interact, during one complete revolution of one of the first or second elements about an associated axis of rotation, with each circuit of the at least one first track and/or with each circuit of the at least one second track.

21. Electromagnetic machine comprising two first elements, each of the first elements having:

at least one first electrically conductive track in the form of a crenellated annular line able to form a first plurality of electromagnetic circuits able to interact with at least one magnetic element of the electromagnetic machine, at least one second electrically conductive track arranged in the form of a crenellated annular line able to form a second plurality of electromagnetic circuits able to interact with at least one magnetic element of the electromagnetic machine, the second track being formed along the corresponding first track and so that the circuits of the second plurality of electromagnetic circuits are each disposed between two successive circuits of the first plurality of electromagnetic circuits, wherein the two first elements are disposed on either side of a second element along an axis of rotation associated with a relative movement of rotation, the second element being provided with at least one magnetic element adapted so as to interact with the circuits of at least one of the two first elements during the relative movement of rotation between the at least one of the two first elements and the second element, wherein the machine comprises two additional elements, each of the additional elements comprising:

at least one first electrically conductive track having the form of an annular crenellated line so as to form a first plurality of electromagnetic circuits able to interact with at least one magnetic element of the electromagnetic machine, at least one second electrically conductive track arranged in the form of an annular crenellated line so as to form a second plurality of electromagnetic circuits able to interact with at least one magnetic element of the electromagnetic machine, the second track being formed along the corresponding first track and so that the circuits of the second plurality of electromagnetic circuits are each disposed between two successive circuits of the first plurality of electromagnetic circuits, wherein the two additional elements radially surround the second element.

* * * * *